(12) United States Patent
Zagorski (10) Patent No.: US 7,866,427 B2
(45) Date of Patent: Jan. 11, 2011

(54) VEHICLE MULTI-STAGE INTEGRATED BRAKE ASSIST FOR A COLLISION PREPARATION SYSTEM

(75) Inventor: Chad T. Zagorski, Clarkston, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 219 days.

(21) Appl. No.: 12/168,973

(22) Filed: Jul. 8, 2008

(65) Prior Publication Data
US 2010/0006363 A1   Jan. 14, 2010

(51) Int. Cl.
*B60T 8/00* (2006.01)
(52) U.S. Cl. ............... 180/167; 180/168; 180/169; 180/175; 180/177; 180/271; 180/274; 180/275; 701/45; 701/48; 701/96; 701/301
(58) Field of Classification Search ............ 180/167, 180/168, 169, 271, 274, 275, 175, 177; 701/45, 701/48, 96, 301
See application file for complete search history.

(56) References Cited

U.S. PATENT DOCUMENTS

| 5,158,343 | A | * | 10/1992 | Reichelt et al. | .......... 303/113.4 |
| 5,762,407 | A | | 6/1998 | Stacey et al. | |
| 5,941,919 | A | | 8/1999 | Pastor et al. | |
| 5,952,939 | A | | 9/1999 | Nakazawa et al. | |
| 6,084,508 | A | | 7/2000 | Mai et al. | |
| 6,226,593 | B1 | | 5/2001 | Kurz et al. | |
| 6,238,021 | B1 | * | 5/2001 | Sugimoto | ................ 303/193 |
| 6,292,753 | B1 | * | 9/2001 | Sugimoto et al. | .......... 701/301 |
| 6,473,681 | B1 | | 10/2002 | Eckert et al. | |
| 6,517,172 | B1 | | 2/2003 | Bond, III et al. | |
| 6,604,042 | B2 | * | 8/2003 | Maruko et al. | ............... 701/96 |
| 6,659,572 | B2 | * | 12/2003 | Bond et al. | ................. 303/193 |
| 7,015,805 | B2 | | 3/2006 | Knoop et al. | |
| 7,034,668 | B2 | * | 4/2006 | Engelman et al. | .......... 340/435 |
| 7,035,735 | B2 | | 4/2006 | Knoop et al. | |
| 7,213,687 | B2 | | 5/2007 | Sakai et al. | |
| 7,245,231 | B2 | | 7/2007 | Kiefer et al. | |
| 7,280,902 | B2 | | 10/2007 | Seki | |
| 7,321,819 | B2 | * | 1/2008 | Seki | ............................ 701/96 |
| 7,395,144 | B2 | * | 7/2008 | Isaji et al. | .................... 701/70 |
| 7,425,043 | B2 | * | 9/2008 | Doerr et al. | ................. 303/193 |
| 2002/0026273 | A1 | * | 2/2002 | Tamura et al. | ................ 701/70 |
| 2003/0106732 | A1 | * | 6/2003 | Watanabe et al. | .......... 180/169 |
| 2004/0254729 | A1 | | 12/2004 | Browne et al. | |
| 2006/0031015 | A1 | | 2/2006 | Paradie | |

OTHER PUBLICATIONS

Society of Automotive Engineers (SAE) document on "Automotive Stability Enhancement Systems", publication J2564 (Dec. 2000, Jun. 2004).

\* cited by examiner

*Primary Examiner*—Paul N. Dickson
*Assistant Examiner*—Barry Gooden, Jr.

(57) ABSTRACT

A motor vehicle multi-stage integrated brake assist (MSIBA) system, which can provide at least one brake assist level of a plurality of predetermined levels of brake assist (i.e., deceleration) less than or greater than the required amount of braking (i.e., deceleration) calculated by the MSIBA to avoid a collision with an obstacle at the time the driver initiates braking, but allows the driver to increase or remove the provided predetermined level of brake assist.

10 Claims, 4 Drawing Sheets

VEHICLE MULTI-STAGE INTEGRATED BRAKE ASSIST FOR A COLLISION PREPARATION SYSTEM

TECHNICAL FIELD

The present invention relates to vehicle collision preparation systems incorporating an integrated brake assist, and more particularly to a vehicle collision preparation system providing multiple stages of integrated brake assist so as to thereby anticipate driver behavior.

BACKGROUND OF THE INVENTION

Electronic Stability Control (ESC) is the generic term for systems designed to improve a motor vehicle's handling, particularly at the limits where the driver might lose control of the motor vehicle. See, for example, the Society of Automotive Engineers (SAE) document on "Automotive Stability Enhancement Systems", publication J2564 (Dec. 2000, Jun. 2004). ESC compares the driver's intended direction in steering and braking inputs to the motor vehicle's response, via lateral acceleration, rotation (yaw) and individual wheel speeds, and then brakes individual front or rear wheels and/or reduces excess engine power as needed to help correct understeer (plowing) or oversteer (fishtailing). ESC also integrates all-speed traction control which senses drive-wheel slip under acceleration and individually brakes the slipping wheel or wheels, and/or reduces excess engine power until control is regained. ESC cannot override a car's physical limits. Of course, if a driver pushes the possibilities of the car's chassis and ESC too far, ESC cannot prevent a crash. It is a tool to help the driver maintain control. ESC combines anti-lock brakes, traction control and yaw control (yaw is spin around the vertical axis).

ESC systems use several sensors in order to determine the state the driver wants the motor vehicle to be in (driver demand). Other sensors indicate the actual state of the motor vehicle (motor vehicle response). The ESC control algorithm compares both states and decides, when necessary, to adjust the dynamic state of the motor vehicle. The sensors used for ESC have to send data at all times in order to detect possible defects as soon as possible. They have to be resistant to possible forms of interference (rain, potholes in the road, etc.). The most important sensors are: 1) steering wheel sensor, used to determine the angle the driver wants to take, often based on anisotropic magnetoresistive (AMR) elements; 2) lateral acceleration sensor, used to measure the lateral acceleration of the motor vehicle; 3) yaw sensor, used to measure the yaw angle (rotation) of the motor vehicle, can be compared by the ESC with the data from the steering wheel sensor in order to take a regulating action; and 4) wheel speed sensors used to measure the wheel speeds.

ESC uses, for example, a hydraulic modulator to assure that each wheel receives the correct brake force. A similar modulator is used with anti-lock brake systems (ABS). ABS needs to reduce pressure during braking only. ESC additionally needs to increase brake pressure in certain situations.

The heart of the ESC system is the electronic control unit (ECU) or electronic control module (ECM), i.e., motor vehicle controller or microprocessor. Diverse control techniques are embedded in the ECU and often, the same ECU is used for diverse systems at the same time (ABS, traction control, climate control, etc.). The desired motor vehicle state is determined based on the steering wheel angle, its gradient and the wheel speed. Simultaneously, the yaw sensor measures the actual state. The controller computes the needed brake or acceleration force for each wheel and directs the actuation of, for example, the valves of a hydraulic brake modulator.

Motor vehicles utilizing electronic stability control systems require some means of determination of the driver's intended motor vehicle behavior (i.e., intended motor vehicle path or track). In General Motors Corporation's (GM's) StabiliTrak system, these means are accomplished by the driver command interpreter, as described in U.S. Pat. No. 5,941,919, issued Aug. 24, 1999 to the assignee hereof, the entire disclosure of which patent is hereby herein incorporated by reference.

Figure 1:
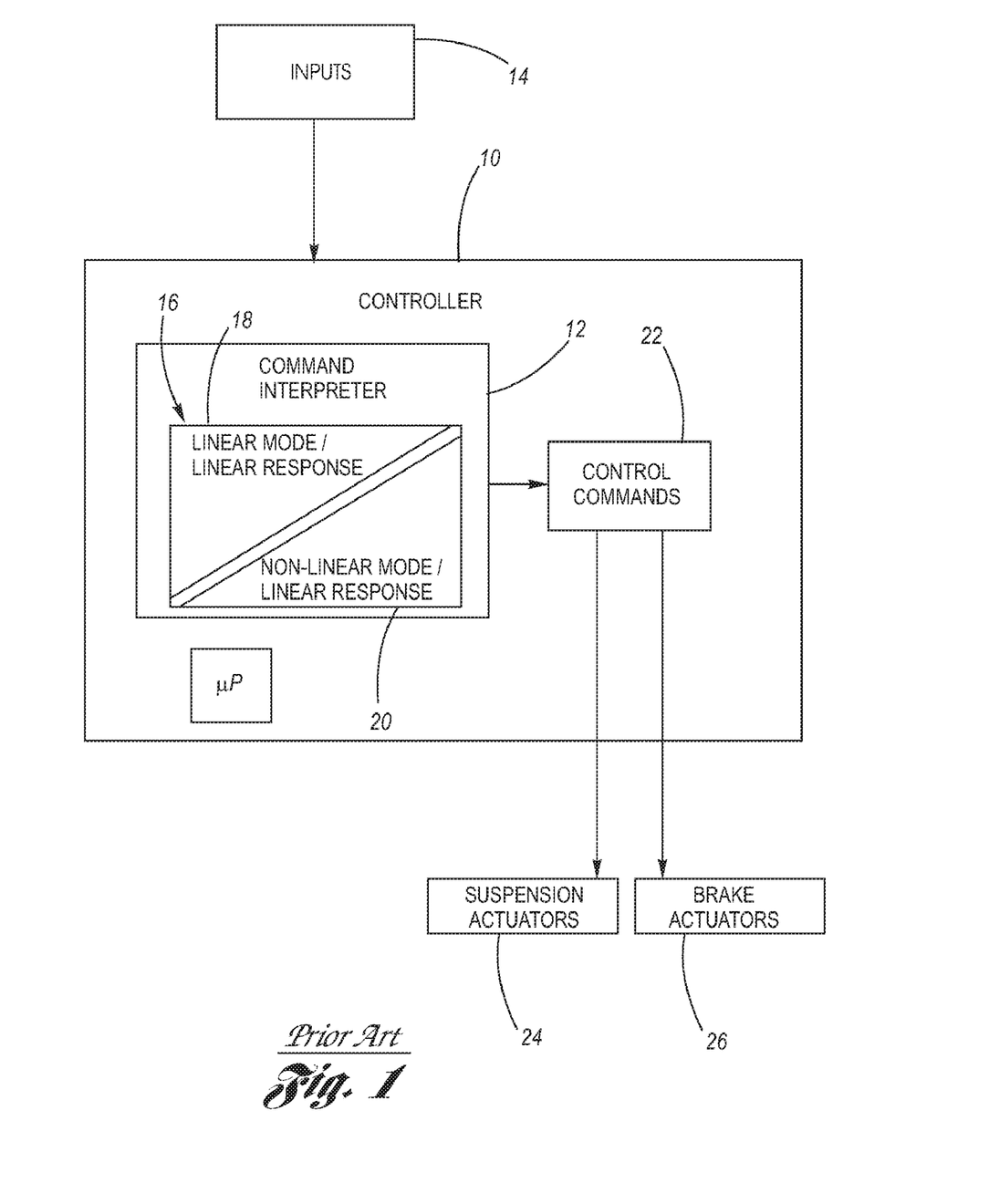
FIG. 1 is a block diagram of a prior art electronic stability control system.

Referring now to FIG. 1, the exemplar control structure described in U.S. Pat. No. 5,941,919 is shown. The controller 10 includes command interpreter 12 receiving the various system inputs 14 from various vehicle sensors. The command interpreter 12 develops desired yaw rate commands responsive to the various system inputs and a data structure 16 stored in non-volatile memory of controller 10. The data structure 16 has a data subset 18 corresponding to vehicle operation in linear mode and a data subset 20 corresponding to vehicle operation in non-linear mode.

When the vehicle operation is in the linear mode, the command interpreter 12, using data structure subset 18, provides commands to a control block 22 designed to maintain the linear response of the vehicle. For example, when the control according to this patent is used to control wheel brakes to affect vehicle yaw control, the commands provided by block 12 do not modify the wheel brake operation while the vehicle is in the linear mode. When the control according to this patent is used to control a vehicle variable force suspension system, the suspension control is provided to maintain the current driving conditions, and not to induce a change in understeer or oversteer.

When the vehicle operation is in the non-linear region, the command interpreter 12, using data structure subset 20, provides commands to the control block 22 commanding a yaw rate linearly responsive to the vehicle steering wheel input. Block 22 uses the command generated at block 12 to control one or more vehicle chassis systems, such as controllable suspension actuators, represented by block 24 and/or brakes, represented by block 26 to bring the actual vehicle yaw into a linear relationship with vehicle steering wheel angle. This control thus maintains the yaw response of the vehicle linear with respect to the steering wheel input even when the vehicle is operating in its nonlinear performance region.

Collision preparation systems are known in the art, as for example exemplified by U.S. Pat. No. 7,280,902 which discloses a motor vehicle deceleration control apparatus; U.S. Pat. No. 7,035,735 which discloses a method and device for automatically triggering a deceleration of a motor vehicle; and U.S. Patent Application Publication 2004/0254729 which discloses a pre-collision assessment of potential collision severity for motor vehicles.

Of particular interest with regard to the present invention, are U.S. Pat. No. 5,952,939, issued Sep. 14, 1999; U.S. Pat. No. 6,226,593, issued May 1, 2001; U.S. Pat. No. 6,084,508, issued Jul. 4, 2000; U.S. Pat. No. 6,517,172, issued Feb. 11, 2003; and U.S. Pat. No. 7,213,687, issued May 8, 2007; wherein the disclosures of all of the aforesaid patents (i.e., U.S. Pat. Nos. 5,952,939; 6,226,593; 6,084,508; 6,517,172; and 7,213,687) are hereby herein incorporated by reference.

U.S. Pat. No. 5,952,939 discloses a collision prevention device incorporating a vehicle braking force based on the comparison of the depression angle of the brake pedal and a calculated minimum required braking force to avoid a collision wherein the larger of these two forces is applied for braking.

U.S. Pat. No. 6,226,593 discloses a method for braking a motor vehicle at low speeds in order to avoid a collision with an obstacle in its immediate vicinity. The distance and the relative speed between the vehicle and the obstacle are determined by sensor and are based on the calculation of a necessary braking pressure or a deceleration. The brake pressure is generated at least partially independently of the driver.

U.S. Pat. No. 6,084,508 discloses a collision preparation system which provides autonomous braking in certain situations. The method and arrangement for emergency braking of a vehicle includes a detection system on the vehicle which detects obstacles located in or near the direction of motion of the vehicle and generates corresponding data, sensors on the vehicle which generate data representing characteristic parameters of the condition of the vehicle, and an evaluating unit which determines, from the data on the obstacles and the parameters of the condition of the vehicle, target values for controlling the motion of the vehicle and, only upon determining that an impending collision of the vehicle with an obstacle is no longer avoidable by any action on the vehicle by steering or braking, triggers an autonomous emergency braking for rapid deceleration of the vehicle.

U.S. Pat. No. 6,517,172 discloses a collision preparation system incorporating a brake assist system which provides autonomous braking in certain situations. When a forward detection apparatus detects an imminent collision, the braking system automatically applies braking force to the vehicle while the vehicle engine speed is reduced. The amount of brake force applied is a continuous function of relative speed, relative distance, collision probability, and target classification.

U.S. Pat. No. 7,213,687 discloses a collision preparation system which also incorporates a brake assist system which provides autonomous braking in certain situations. A vehicle emergency brake system has a second brake for braking a vehicle by increasing the frictional resistance with the road surface, a millimeter wave radar for detecting any obstacle in an advancing direction, pedal speed sensor for detecting the step-in speed of a brake pedal for actuating a first brake, and a controller for actuating the second brake.

The above-cited U.S. Patents provide for an automatic braking The automatic braking is either automatically initiated braking or braking which is initiated by the driver, but is performed automatically. Both possibilities share the feature, however, that a strong deceleration to avoid a collision or to reduce the collision speed may occur during braking, the deceleration of which corresponds to approximately the maximum possible vehicle deceleration.

Motor vehicle collision preparation systems (CPS) incorporating brake assist systems providing a calculated amount of braking (i.e. deceleration) required to avoid a collision with an obstacle when the vehicle driver thereafter applies the brakes are herein referred to as "integrated brake assist" (IBA) systems.

After actuation of a CPS incorporating an integrated brake assist system (IBA), the IBA constantly calculates the amount of braking (i.e., deceleration) required to avoid a collision with an obstacle. If the vehicle driver thereafter applies the brakes, the calculated amount of braking (i.e., deceleration) required to avoid a collision with an obstacle is automatically applied but never less than the driver requested braking. That is, if the driver requests more braking (i.e., more deceleration) than is to be applied, the driver requested braking is applied. However, the IBA may provide more deceleration of the vehicle than necessary in some circumstances. For example, for an accelerating obstacle or an obstacle which is soon to be out of the vehicle's path, less deceleration may be desired than is to be applied.

Accordingly, what is needed in the art is to provide vehicle multi-stage integrated brake assist, enabled after actuation of a CPS incorporating an IBA system, which can provide a brake assist level of a plurality of levels of brake assist (i.e., deceleration) less than or greater than the amount of braking (i.e., deceleration) required to avoid a collision with an obstacle but allows the driver to increase or remove the provided brake assist.

SUMMARY OF THE INVENTION

The present invention is a motor vehicle multi-stage (or multi-level) integrated brake assist (MSIBA) system, enabled after actuation of a CPS, wherein the MSIBA system serves as the incorporated integrated brake assist (IBA) system of the CPS. The MSIBA system can provide at least one brake assist level of a plurality of predetermined levels of brake assist (i.e., deceleration) less than or greater than the required amount of braking (i.e., deceleration) calculated by the MSIBA to avoid a collision with an obstacle at the time the driver initiates braking, but allows the driver to increase or remove the provided predetermined level of brake assist.

In this regard, inputs from the motor vehicle and a CPS are evaluated in an electronic controller according to predetermined programming, wherein, after actuation of a CPS, an MSIBA system is enabled and driver requested braking, thereafter, greater than, or equal to, a predetermined brake assist level, is adjusted to provide at least one brake assist level of a plurality of predetermined brake assist levels.

The MSIBA system is enabled after actuation of a CPS by, for example, a predetermined (i.e., empirically determined) or calculated time or distance from motor vehicle data available to the CPS. The predetermined brake assist levels are established according to driver initiated braking, whereby brake pedal position with respect to full brake pedal travel in conjunction with simultaneous brake pedal velocity with respect to percent of full brake pedal travel per second, defines selection of a given brake assist level with a corresponding braking (i.e., deceleration), per the vehicle deceleration required to avoid a collision with an obstacle as calculated by the MSIBA at the time the driver initiates braking. The driver can remove the provided brake assist, increase the provided brake assist (if not already at the maximum brake assist level), or increase braking. Full brake pedal travel and brake pedal velocity with respect to percent of full brake pedal travel per second are known parameters for each vehicle.

An exemplification of the foregoing description of the MSIBA system according to the present invention incorporates three brake assist levels (more or less levels than three may be utilized in the MSIBA system, and three levels is merely by way of exemplification). Per the exemplification, after a MSIBA system is enabled, three brake assist levels may be selected (or set) by the MSIBA system, denoted as: "Brake Assist Level 1", which is a relatively light level of brake assist; "Brake Assist Level 2", which is a relatively mid-level of brake assist; and "Brake Assist Level 3", which is a relatively high or full-level of brake assist. The parameters defining which brake assist level is selected (or set) as the operative brake assist level by the MSIBA system are summarized at Table 1, which is to be regarded merely by way of an example of brake levels and the parameters associated therewith.

TABLE 1

| Brake Assist Level | Brake Pedal Position (% of full brake pedal travel) | Brake Pedal Velocity (% of full brake pedal travel per second) | Braking (Deceleration) |
|---|---|---|---|
| 1 | ≧30% | ≧120% | 0.8 B |
| 2 | ≧50% | ≧150% | 0.9 B |
| 3 | ≧70% | ≧200% | 1.05 B |

Brake Assist Level 1 is established if the driver depresses the brake pedal ≧30% of full brake pedal travel and simultaneously brake pedal velocity is ≧120% of full brake pedal travel per second; wherein Brake Assist Level 1 provides a braking (i.e., deceleration) of 0.8 B, where B is the amount of braking (i.e., deceleration) required to avoid a collision with an obstacle as calculated by the MSIBA at the time the driver initiates braking.

Brake Assist Level 2 is established if the driver depresses the brake pedal ≧50% of full brake pedal travel and simultaneously brake pedal velocity is ≧150% of full brake pedal travel per second; wherein Brake Assist Level 2 provides a braking (i.e., deceleration) of 0.9 B where B is the amount of braking (i.e., deceleration) required to avoid a collision with an obstacle as calculated by the MSIBA at the time the driver initiates braking.

Brake Assist Level 3 is established if the driver depresses the brake pedal ≧70% of full brake pedal travel and simultaneously brake pedal velocity is ≧200% of full brake pedal travel per second; wherein Brake Assist Level 3 provides a braking (i.e., deceleration) of 1.05 B where B is the amount of braking (i.e., deceleration) required to avoid a collision with an obstacle as calculated by the MSIBA at the time the driver initiates braking.

However, if driver requested braking results in a deceleration greater than that currently being provided by the MSIBA system, the driver's request is honored whereby braking is thereby responsive to the driver's braking requests. MSIBA is still considered active at this point and its requests will be honored if and when the driver's requested deceleration drops below MSIBA's requested deceleration. Brake pedal position and brake pedal velocity for a given brake assist level as indicated at Table 1 must both be satisfied to establish the brake assist level with the corresponding braking as depicted in Table 1. For example, if driver requested braking is 70% of full brake pedal travel and the simultaneous brake pedal velocity is <200% of full brake pedal travel per second but at least 150% of full brake pedal travel per second, Brake Assist Level 2 is selected by the MSIBA system (not Brake Level Assist Level 3). But, if the driver, subsequently, increases braking to above 70% of full brake pedal travel and the simultaneous brake pedal velocity is ≧200% of full brake pedal travel per second, then Brake Assist Level 3 is selected by the MSIBA system. If after the MSIBA level 1, 2, or 3 are invoked and the driver reduces the braking request while in the event to a lesser amount, the highest MSIBA level the driver reached shall continue to be active. However, if, subsequently, the driver stops braking, the brake assist level ceases to be active and the corresponding deceleration is removed. Where driver requested braking is less than what triggers brake assist level 1, the MSIBA system is not actuated.

In the case the CPS determines that an impending collision of the vehicle with an obstacle is no longer avoidable by any action on the vehicle by steering or braking, then Brake Assist Level 3 is set by the MSIBA system, provided driver requested braking is equal to, or greater than, Brake Assist Level 1. By "impending collision" is meant that the vehicle is crossing a point, determined by the CPS, after which an impending collision of the vehicle with an obstacle is no longer avoidable by any action on the vehicle by steering or braking, referred to herein as the "Collision Judgment Line".

In the event the driver requests braking prior to the enabling of the MSIBA system, the MSIBA system is not enabled because the driver is already braking.

Accordingly, it is an object of the present invention to provide a vehicle multi-stage (or multi-level) integrated brake assist (MSIBA) system, enabled after actuation of a CPS, which provides at least one level of a plurality of predetermined levels of brake assist (i.e., deceleration) less than or greater than the required amount of braking (i.e., deceleration) by the MSIBA to avoid a collision with an obstacle at the time the driver initiates braking, but allows the driver to increase or remove the provided predetermined level of brake assist.

This and additional objects, features and advantages of the present invention will become clearer from the following specification of a preferred embodiment.

DESCRIPTION OF THE PREFERRED EMBODIMENT

Figure 2:
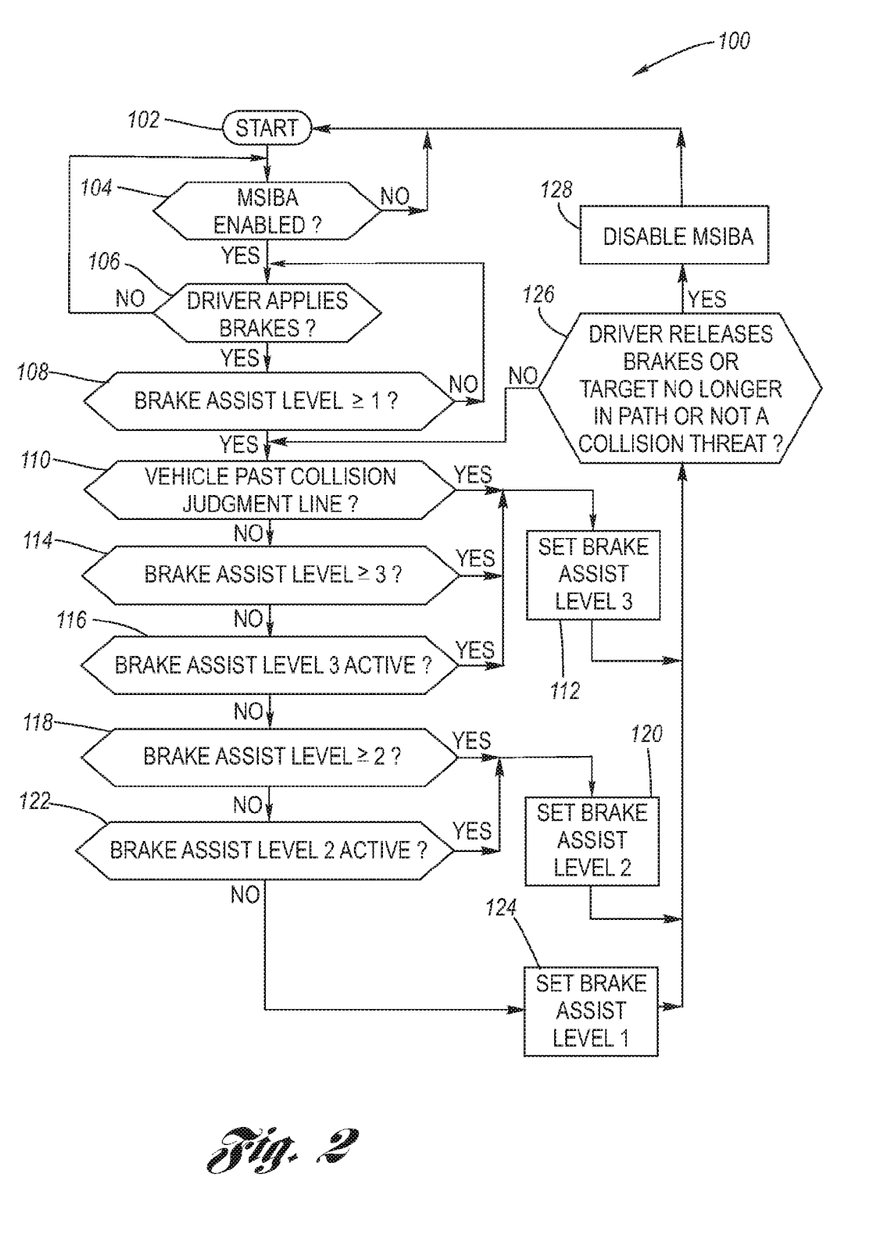
FIG. 2 is a block diagram of an algorithm for implementing programming according to the present invention.
Figure 3A:
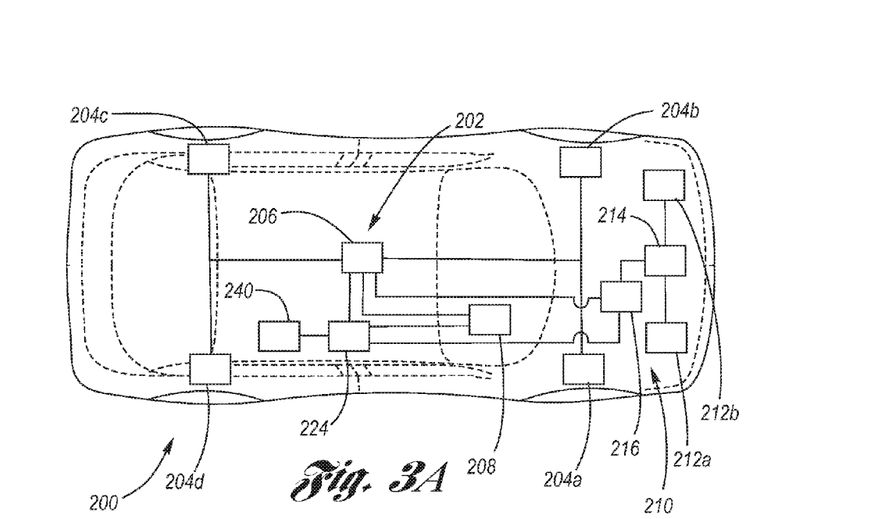
FIG. 3A is a schematic depiction of a motor vehicle equipped with a CPS and an exemplar motor vehicle multi-stage integrated brake assist system in accordance with the present invention.
Figure 3B:
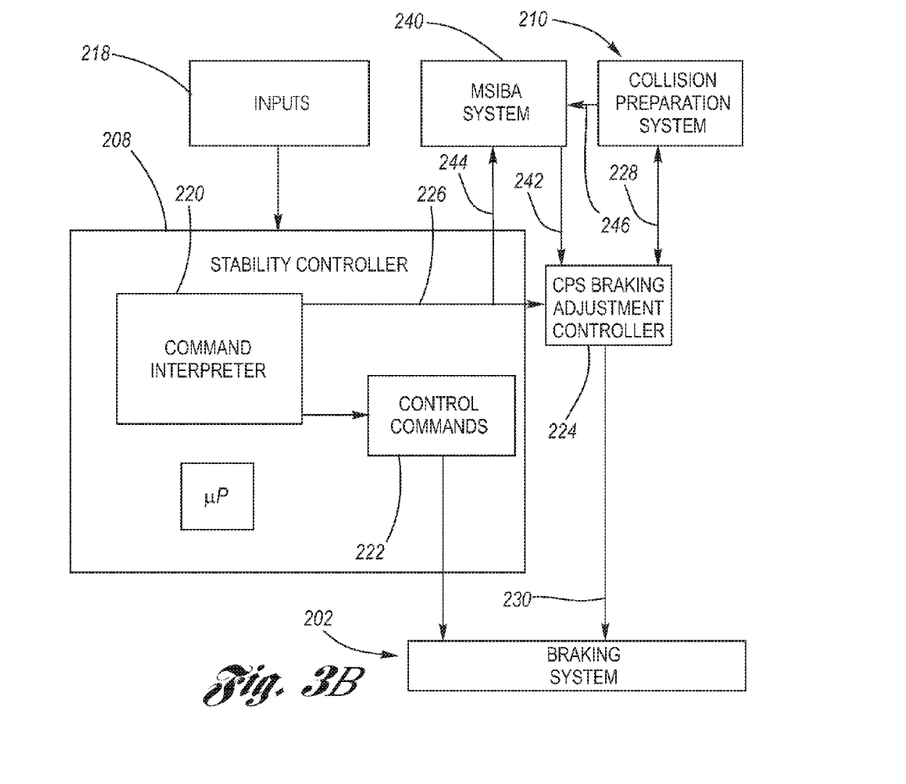
FIG. 3B is a block diagram of an apparatus for carrying out the present invention.
Figure 4:
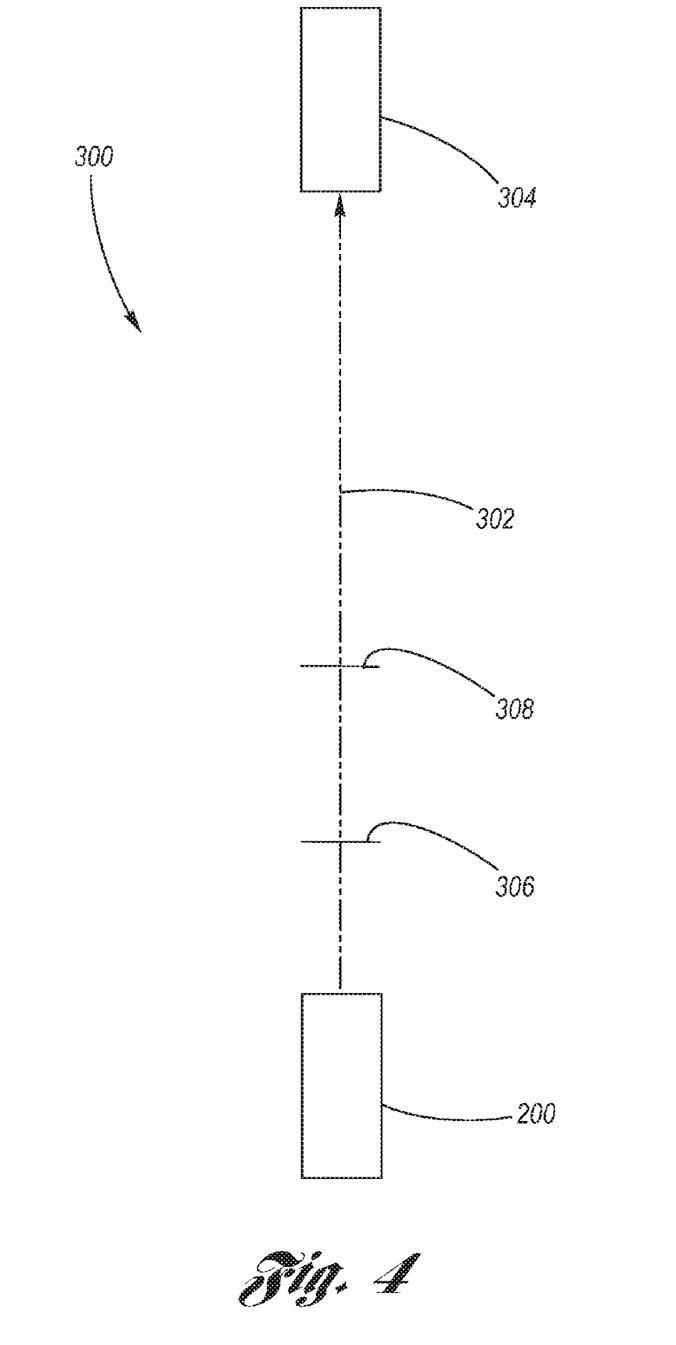
FIG. 4 is a diagrammatic exemplification of operation of the present invention.

Referring now to the Drawing, FIGS. 2 through 4 depict aspects of an example of a motor vehicle multi-stage (or multi-level) integrated brake assist (MSIBA) system, utilizing, by way of example, three brake assist levels, which are implemented after actuation of a collision preparation system (CPS).

FIG. 2 is an example of a programming algorithm 100 for carrying out, by way of example, a three level motor vehicle MSIBA system, as previously described, according to the present invention, which is resident in an electronic controller, as for example exemplified at 240 of FIGS. 3A and 3B.

The algorithm starts at Block 102 and proceeds to Block 104 awaiting the MSIBA system to be enabled upon activation of the CPS. When MSIBA system is enabled, control passes to Block 106 awaiting the driver to apply the brakes, after which control passes to Block 108.

At Block 108, if the driver requests braking greater than or equal to Brake Assist Level 1, as previously described and depicted in Table 1, control passes to Block 110. Otherwise control passes to Block 106.

At Block 110, if the driver's vehicle is past the Collision Judgment Line (i.e., the driver has initiated braking after the Collision Judgment Line; see for example 308 of FIG. 4), control passes to Block 112 whereat Brake Assist level 3, as previously described and depicted in Table 1, is set after which control passes to Block 126. Otherwise, control passes to Block 114. At Block 114, if driver requested braking is greater than or equal to Brake Assist Level 3, control passes to Block 112. Otherwise, control passes to Block 116.

At Block 116, if Brake Assist Level 3 is set, control passes to Block 112 whereat Brake Assist Level 3 remains set. Otherwise, control passes to Block 118.

At Block 118, if the driver requests braking greater than or equal to Brake Assist Level 2, as previously described and depicted in Table 1, control passes to Block 120 whereat Brake Assist level 2 is set after which control passes to Block 126. Otherwise, control passes to Block 122.

At Block 122, if Brake Assist Level 2 is set, control passes to Block 120 whereat Brake Assist Level 2 remains set. Otherwise, control passes to Block 124 whereat Brake Assist Level 1, as previously described and depicted in Table 1, is set after which control passes to Block 126.

At Block 126, if the driver stops braking, or the obstacle is no longer in the path, and/or there is no longer a threat of collision (as determined by predetermined programming of the CPS), control passes to Block 128 whereat MSIBA is disabled and the presently set brake assist level of Brake Assist Levels 1, 2, or 3 ceases to be active and deceleration is removed after which control passes to Block 102. Otherwise, control passes to Block 110.

FIGS. 3A and 3B depict an exemplification of a hardware implementation for the vehicle path control algorithm 100 of FIG. 2.

FIG. 3A depicts a motor vehicle 200 having a braking system 202 including brake actuators 204a, 204b, 204c, 204d and a brake controller 206. A stability controller 208 operates at least in part as the controller 10 of FIG. 1. A collision preparation system (CPS) 210 is interfaced with the braking system 202. The CPS 210 may be, for example, implemented by the disclosure of any of aforementioned U.S. Pat. No. 5,952,939; U.S. Pat. No. 6,226,593; U.S. Pat. No. 6,084,508, U.S. Pat. No. 6,517,172 or U.S. Pat. No. 7,213,687, and may include, for example, short range radar 212a, 212b, long range radar 214 and an evaluating unit 216. A collision preparation system braking adjustment controller 224 is interfaced with the braking system 202 so as to adjust the braking in accordance with the present invention, and receives operational data to carryout its function, as for example from the CPS 210 and the stability controller 208. The MSIBA system 240 is resident in a controller and is interfaced with the collision preparation system braking adjustment controller 224 through which the MSIBA system sets the selected brake assist level, as described hereinabove.

FIG. 3B depicts the electronic implementation of FIG. 3A, wherein inputs 218 from various sensors and other data sources of the motor vehicle 200 are provided to the stability controller 208. The stability controller 208 includes a command interpreter 220, as for example that shown at 12 of FIG. 1. The stability controller 208 utilizes the command interpreter 220 and the control commands block 222, as for example that shown at 22 of FIG. 1, to control operation of the braking system 202 in the manner described hereinabove with respect to FIG. 1 and U.S. Pat. No. 5,941,919.

According to the example of FIG. 3B, the CPS braking adjustment controller 224 has provided to it, via a data line 226, the driver braking request, the yaw rate and/or other data providing actual motor vehicle travel path information, and the steering wheel position and/or other data providing the driver intended motor vehicle travel path information, all available from the command interpreter 220. Further, the MSIBA system 240 has available to it, via data line 244, brake pedal position and brake pedal velocity from data line 226, and further has available to it, via data line 246 the activation status of the CPS 210. The CPS braking adjustment controller 224 further has available to it, via a data line 228, the activation status of the CPS 210. The CPS braking adjustment controller 224 further has available to it, via a data line 242, the output of the MSIBA system 240. In this regard, the MSIBA determines and selects Brake Assist Level 1, 2, or 3 which selection is then complied with by the CPS braking adjustment controller, wherein the CPS braking adjustment controller 224 sends a braking signal, via data line 230, to the braking system in accordance with the present invention as per FIG. 2.

FIG. 4 is a vehicle path depiction 300 for the motor vehicle 200 of FIG. 3A, showing a driver intended motor vehicle path 302 which has in that path an obstruction 304 which has been detected by the CPS (210 of FIGS. 3A and 3B) and in response thereto the MSIBA system is enabled at point 306 of the motor vehicle path, wherein the Collision Judgment Line is depicted at point 308 and the CPS braking adjustment controller (224 of FIGS. 3A and 3B) provides the appropriate brake assist level according to the present invention.

The following examples exemplify operation of the present invention in accordance with FIG. 2, utilizing the three Brake Assist Levels, 1, 2 and 3, as previously described and indicated in Table 1, wherein reference is additionally directed to FIG. 4.

Example 1

Driver Does not Initiate Braking

The motor vehicle 200 is traveling on a two lane road and approaches a stalled car 304 in its path 302. The incident is detected and CPS and MSIBA system are enabled. The driver is inattentive and never presses the brake pedal. Because the driver never presses the brake pedal, the MSIBA system never goes active.

Example 2

Driver Initiates Braking Before the MSIBA System is Enabled

The motor vehicle 200 is traveling on a two lane road and approaches a stalled car 304 in its path 302. The driver begins braking to avoid the stalled car before the MSIBA system is enabled. The incident is detected and CPS is enabled but the MSIBA system is not enabled because the driver is already braking.

Example 3

After the MSIBA System is Enabled, Driver Initiates Braking Before or at the Collision Judgment Line The motor vehicle 200 is traveling on a two lane road and approaches a stalled car 304 in its path 302. The incident is detected and CPS and the MSIBA system are enabled. The driver initiates braking before the Collision Judgment Line 308. The brake assist level is set as previously described, depicted in Table 1, and exemplified in FIG. 2.

Example 4

Driver Initiates Braking after Collision Judgment Line

The motor vehicle 200 is traveling on a two lane road and approaches a stalled car 304 in its path 302. The incident is detected and CPS and the MSIBA system are enabled. The driver initiates braking after the Collision Judgment Line 308 such that, if the brake assist level to be established, as previously described, depicted in Table 1, and exemplified in FIG. 2, is at least Brake Assist Level 1, then Brake Assist Level 3 is set in this case. However, if driver requested braking results in a deceleration greater than that provided by Brake Assist Level 3, MSIBA control is terminated whereby braking is thereby responsive to the driver's braking requests, as previously described, depicted in Table 1, and exemplified in FIG. 2.

Example 5

Driver Initiates Braking Before the MSIBA System is Enabled and then Increases Braking The motor vehicle 200 is traveling on a two lane road and approaches a stalled car 304 in its path 302. The driver begins braking to avoid the stalled car before the MSIBA system is enabled and then, subsequently, increases braking. The incident is detected and CPS is enabled but the MSIBA system is not enabled because the driver is already braking.

Example 6

Driver Initiates Braking After the MSIBA System is Enabled and then Increases Braking The motor vehicle 200 is traveling on a two lane road and approaches a stalled car 304 in its path 302. The incident is detected and CPS and the MSIBA system are enabled. The driver initiates braking before the Collision Judgment Line 308. The brake assist level is set as previously described, depicted in Table 1, and exemplified in FIG. 2. If the driver, subsequently, increases braking, then the brake assist level is set as previously described, depicted in Table 1, and exemplified in FIG. 2.

Example 7

Driver Initiates Braking After the MSIBA System is Enabled and then Decreases Braking The motor vehicle 200 is traveling on a two lane road and approaches a stalled car 304 in its path 302. The incident is detected and CPS and the MSIBA system are enabled. The driver initiates braking before the Collision Judgment Line 308. The brake assist level is set as previously described, depicted in Table 1, and exemplified in FIG. 2. If the driver, subsequently, decreases braking but is still requesting braking, then the present brake assist level shall remain set as previously described and exemplified in FIG. 2.

Example 8

Driver Initiates Braking After MSIBA System is Enabled and then Stops Braking The motor vehicle 200 is traveling on a two lane road and approaches a stalled car 304 in its path 302. The incident is detected and CPS and the MSIBA system are enabled. The driver initiates braking before the Collision Judgment Line 308. The brake assist level is set as previously described, depicted in Table 1, and exemplified in FIG. 2. If the driver, subsequently, stops braking, then the present brake assist level ceases to be active and deceleration is removed as previously described and exemplified in FIG. 2.

Example 9

Driver Initiates Braking After the MSIBA System is Enabled and then Forward Conflict Situation Resolves The motor vehicle 200 is traveling on a two lane road and approaches a slower moving car 304 in its path 302, but the driver recognizes the car is about to speed up or move out of the path. The incident is detected and CPS and the MSIBA system are enabled. The driver initiates braking before the Collision Judgment Line 308. The brake assist level is set as previously described, depicted in Table 1, and exemplified in FIG. 2. If the car, subsequently, moves out of the path or moves ahead sufficiently, the present brake assist level ceases to be active, the MSIBA system is disabled, and deceleration follows driver requested deceleration as previously described and exemplified in FIG. 2.

A stability control system (as for example discussed in U.S. Pat. No. 5,941,919) is intended to provide vehicle stability by adjusting the braking at the wheels individually and/or adjusting engine power. As such, the brake controller will follow commands of the stability control system in the event a conflict occurs with respect to braking adjustment by the MSIBA algorithm 100.

To those skilled in the art to which this invention appertains, the above described preferred embodiment may be subject to change or modification. Such change or modification can be carried out without departing from the scope of the invention, which is intended to be limited only by the scope of the appended claims.

The invention claimed is:

1. A method for multi-stage integrated brake assist for a collision preparation system of a motor vehicle, comprising the steps of:
   determining a necessary deceleration of the motor vehicle to avoid an impact;
   detecting driver selected braking of the motor vehicle; and
   setting a braking assist responsive to the detecting of driver selected braking if: the driver selected braking meets at least one predetermined braking threshold of a range of predetermined braking thresholds and the driver selected braking is less than the necessary deceleration;
   wherein the detecting of driver selected braking comprises:
   detecting at least one brake pedal position threshold; and
   detecting at least one brake pedal velocity threshold;
   wherein the at least one predetermined braking threshold comprises the driver selected braking meeting simultaneously the at least one brake pedal position threshold and the least one brake pedal velocity threshold;
   wherein the detecting of brake pedal position comprises detecting any of a plurality of position thresholds of respective percents of full brake pedal travel, and the detecting of brake pedal velocity comprises detecting any of a plurality of velocity thresholds of respective percents of full brake pedal travel per unit of time;
   wherein for each position threshold is a corresponding velocity threshold which in combination comprise a respective braking threshold, wherein each respective braking threshold corresponds to a respective brake assist level, and wherein each brake assist level comprises a respective amount by which the braking assist is set in said step of setting;

wherein the range of predetermined braking thresholds comprises brake assist levels ranging from a lowest to a highest in monotonically increasing order; and wherein the brake assist levels comprise:
  a level 1 brake assist level comprising greater than or equal to about 30 percent of full brake pedal position and greater than or equal to about 120 percent of full brake pedal travel per second, wherein the braking assist is set to substantially 80 percent of the necessary deceleration; and
  a level 2 brake assist level comprising greater than or equal to about 50 percent of full brake pedal position and greater than or equal to about 150 percent of full brake pedal travel per second, wherein the braking assist is set to substantially 90 percent of the necessary deceleration.

2. The method of claim 1, further comprising:
detecting whether an obstacle in the path of the motor vehicle in relation to the movement of the motor vehicle is such that a predetermined Collision Judgment Line is crossed, wherein in said step of setting, if the driver selected braking meets at least the predetermined braking threshold for the lowest threshold, then the highest brake assist level is used to set the braking assist in said step of setting.

3. The method of claim 1, wherein the brake assist levels further comprise:
a level 3 brake assist level comprising greater than or equal to about 70 percent of full brake pedal position and greater than or equal to about 200 percent of full brake pedal travel per second, wherein the braking assist is set to substantially 105 percent of the necessary deceleration.

4. The method of claim 3, further comprising:
detecting whether an obstacle in the path of the motor vehicle in relation to the movement of the motor vehicle is such that a predetermined Collision Judgment Line is crossed, wherein in said step of adjusting, if the driver selected braking meets at least the predetermined braking threshold for the lowest threshold, then the highest brake assist level is used to set the braking assist in said step of setting.

5. An apparatus for braking a motor vehicle, comprising:
a braking system;
a collision preparation system interfaced with said braking system;
a collision preparation system braking adjustment controller interfaced with said braking system;
a multi-stage integrated brake assist system interfaced with said collision preparation system and said braking adjustment controller; and
at least one source of data available to said multi-stage integrated brake assist system, said data comprising brake pedal position, brake pedal velocity, and braking request of the driver;
wherein the multi-stage integrated brake assist system increases the braking request of the driver through the collision preparation system braking adjustment controller in response to the brake pedal position and the brake pedal velocity meeting at least one predetermined threshold responsive to said data;
wherein the multi-stage integrated brake assist system responds to said data according to whether at least one brake pedal position threshold and at least one brake pedal velocity threshold have been simultaneously met;
wherein the at least one brake pedal position threshold comprises a plurality of position thresholds of respective percents of full brake pedal travel, and the at least one brake pedal velocity threshold comprises a plurality of velocity thresholds of respective percents of full brake pedal travel per unit of time;
wherein for each position threshold is a corresponding velocity threshold which in combination comprise a respective braking threshold, wherein each respective braking threshold corresponds to a respective brake assist level;
wherein each brake assist level comprises a respective amount by which the braking request of the driver is increased by said multi-stage integrated brake assist system;
wherein the brake assist levels range from a lowest to a highest in monotonically increasing order; and
wherein the brake assist levels comprise:
  a level 1 brake assist level comprising greater than or equal to about 30 percent of full brake pedal position and greater than or equal to about 120 percent of full brake pedal travel per second, wherein the braking request of the driver is increased to substantially 80 percent of the necessary deceleration to avoid a collision based upon the data; and
  a level 2 brake assist level comprising greater than or equal to about 50 percent of full brake pedal position and greater than or equal to about 150 percent of full brake pedal travel per second, wherein the braking request of the driver is increased to substantially 90 percent of the necessary deceleration to avoid the collision.

6. The apparatus of claim 5 wherein if the collision preparation system detects an obstacle in the path of the motor vehicle in relation to the movement of the motor vehicle is such that a predetermined Collision Judgment Line is crossed, and if the data meets at least the predetermined braking threshold for the lowest threshold, then said multi-stage integrated brake assist system uses the highest brake assist level to increase the braking request of the driver.

7. The apparatus of claim 6 wherein said multi-stage integrated braking system increases the braking request of the driver if: the braking request of the driver as determined from the data meets at least one braking assist level, the requested braking of the driver is less than the deceleration necessary to avoid a collision as determined from the data, and the braking request of the driver does not exceed the highest brake assist level.

8. The apparatus of claim 5 wherein the brake assist levels further comprise:
a level 3 brake assist level comprising greater than or equal to about 70 percent of full brake pedal position and greater than or equal to about 200 percent of full brake pedal travel per second, wherein the braking request of the driver is increased to substantially 105 percent of the necessary deceleration to avoid the collision.

9. The apparatus of claim 8 wherein if the collision preparation system detects an obstacle in the path of the motor vehicle in relation to the movement of the motor vehicle is such that a predetermined Collision Judgment Line is crossed, and if the data meets at least the predetermined braking threshold for the lowest threshold, then said multi-stage integrated brake assist system uses the highest brake assist level to increase the braking request of the driver.

10. The apparatus of claim 9 wherein said multi-stage integrated braking system increases the braking request of the driver if: the braking request of the driver as determined from the data meets at least one braking assist level, the requested braking of the driver is less than the deceleration necessary to avoid a collision as determined from the data, and the braking request of the driver does not exceed the highest brake assist level.

* * * * *